April 6, 1948.                H. KOHRMAN                2,439,138
APPARATUS FOR MAKING ARTIFICIAL TEETH
Filed Feb. 20, 1943        3 Sheets-Sheet 1

INVENTOR
HUBERT KOHRMAN
BY
William T. Kresmer
ATTORNEY

April 6, 1948.  H. KOHRMAN  2,439,138
APPARATUS FOR MAKING ARTIFICIAL TEETH
Filed Feb. 20, 1943  3 Sheets-Sheet 2

INVENTOR
HUBERT KOHRMAN.
BY
William T. Kuesner
ATTORNEY

April 6, 1948. H. KOHRMAN 2,439,138
APPARATUS FOR MAKING ARTIFICIAL TEETH
Filed Feb. 20, 1943 3 Sheets-Sheet 3
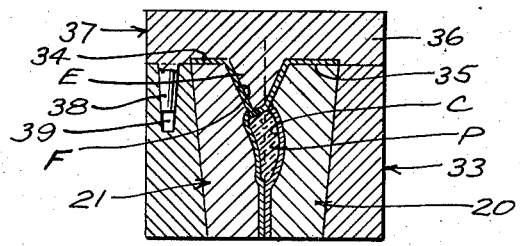
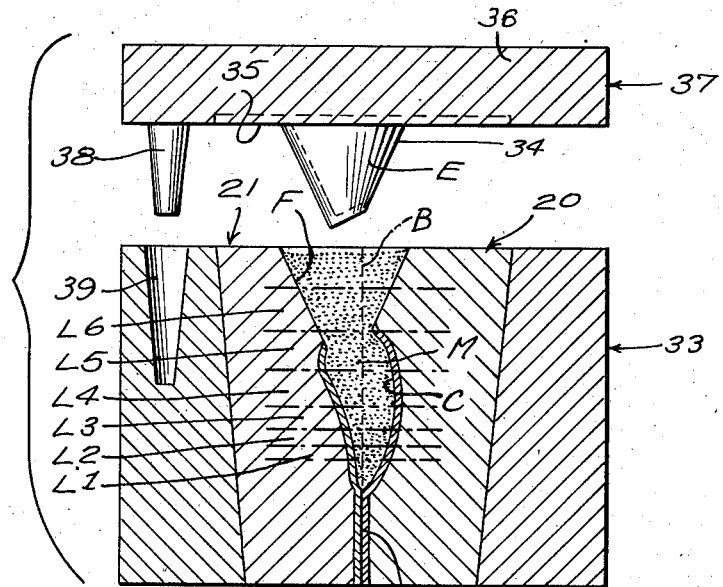
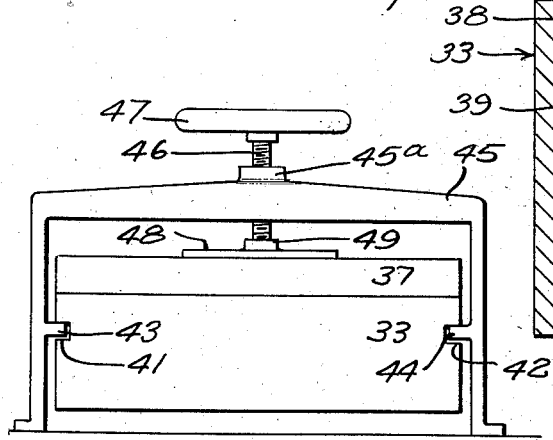
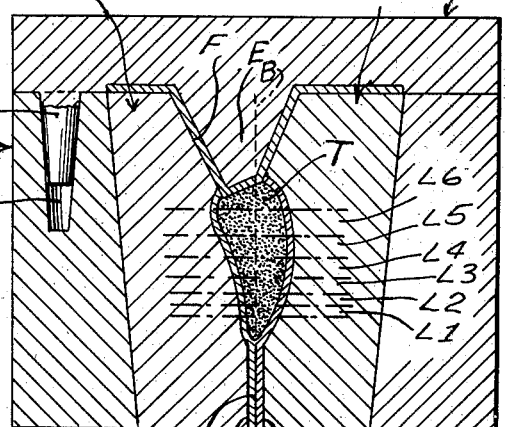
INVENTOR
HUBERT KOHRMAN.
BY
William T. Kiesner
ATTORNEY Patented Apr. 6, 1948

2,439,138

UNITED STATES PATENT OFFICE 2,439,138

APPARATUS FOR MAKING ARTIFICIAL TEETH

Hubert Kohrman, Danbury, Conn.

Application February 20, 1943, Serial No. 476,606

1 Claim. (Cl. 18—34.1)

This invention relates to apparatus for making artificial teeth.

One of the objects of this invention is to provide apparatus for efficiently and inexpensively producing artificial teeth that will be in close simulation, as to conformation and surface and as to coloring, of natural teeth.

Another object is to provide an efficient apparatus, capable of being readily carried on in practice and with dependable and controllable results, for producing artificial teeth having accuracy of simulation in shape, contour and coloring to natural teeth. Another object is to provide simple, practical and efficient molding apparatus for the production of artificial teeth of the above-mentioned nature, and to achieve in such apparatus, inexpensively and dependably, precision of shape and contour for the shaping of the moldable materials to form the teeth. Another object is in general to improve the production of artificial teeth. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claim.

In the accompanying drawings in which is shown a preferred form of certain mechanical features of my invention, Figure 1 is a plan view, partly diagrammatic, showing also in elevation a preferred form of pattern device for making up a mold part;

Figure 11 is a sectional view like that of Figure 10, but showing a third companion mold part assembled thereto and illustrating certain preferred steps in producing the same;

Figure 12 is a view of the mold parts assembled and one of them separated, ready for the tooth-molding operation, and illustrating a preferred method of charging the mold cavities;

Figure 13 is a view like that of Figure 12 showing the construction at the completion of the molding and curing step, and with the mold parts ready to be separated; and Figure 14 is a front elevation on a reduced scale showing a possible form of mechanism for holding the mold parts assembled and capable of being used to disassemble certain parts thereof.

Similar reference characters refer to similar parts throughout the several views of the drawings.

Figure 1:
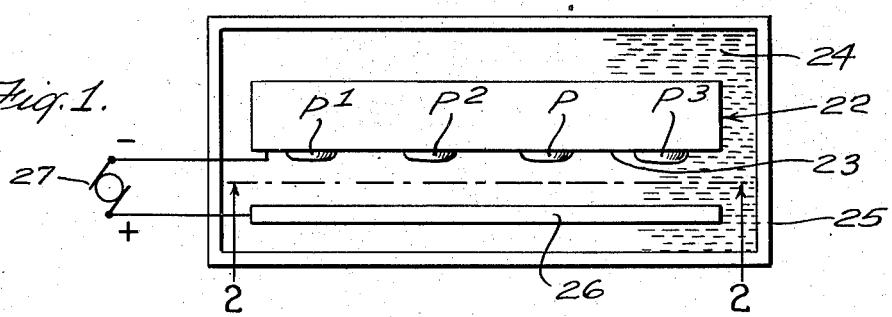

As conducive to a clearer understanding of certain features of this invention, it may at this point be noted that artificial teeth, as heretofore produced, principally of ceramic compositions, have a number of inherent deficiencies and shortcomings such as failure actually to simulate a natural tooth and hence failure to get away from artificiality in appearance, lack of naturalness in coloring and coloring gradations and in lack of accuracy of reproduction of surface contours, difficulty or impossibility of control during processing or manufacture, costliness, and the like, and most of such disadvantages inhere also in known methods and constructions pertaining to teeth made of non-ceramic materials, such as heat-set plastics. Color gradation can be of substantial importance yet has heretofore been ineffectually or not at all satisfactorily produced; features of contour of individual teeth or surface irregularities or surface conformations, so frequently present in natural teeth, have also been difficult or impossible heretofore of satisfactory reproduction. One of the dominant aims of this invention is to overcome in a thoroughly practical, efficient and commercially dependable and feasible manner such deficiencies as have just been noted.

In a preferred form of carrying out certain features of my invention, I prefer to use a mold construction comprising two companion mold parts 20 and 21 (Figures 9 and 10) having a plane of cleavage B to either side of which are companion mold recesses $R^1$ and $R^2$ (Figure 10), the one representing the inner (with respect to the mouth) vertical half of a tooth and the other representing the outer vertical half of the tooth, and together forming a mold cavity C. The mold parts 20 and 21 may have in their respective faces which, when the parts are assembled as in Figure 10, meet in the plane of cleavage B, as many such companion mold recesses for as many differently shaped and contoured teeth as it is desired to produce in one operation and hence the showing in the drawings, as in Figure 9, of four such different tooth mold cavities C, $C^1$, $C^2$ and $C^3$ is to be understood as purely illustrative and not by way of limitation.

Figure 2:
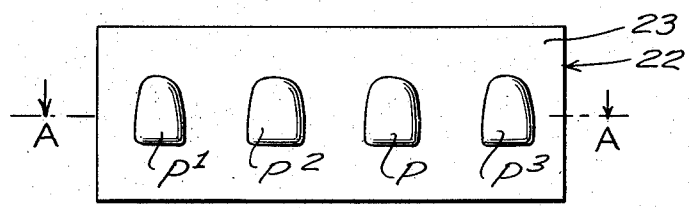
Figure 2 is a front elevation of the pattern device as seen along the line 2—2 of Figure 1.

A preferred method of making up these two mold parts 20 and 21 and a companion mold element later described comprises a succession of steps whereby I am enabled, insofar as contour and surface configuration are concerned, to achieve a reliable accuracy of reproduction, and in these preferred steps I may start with a block 22 of a hardened or set moldable or plastic material or cement, analogous to plaster of Paris, molding clay, molding compositions, or the like, for example, shaping it in any suitable container or mold to give it, for example, a generally rectangular configuration and into one face 23 thereof, while still plastic, I insert or press, flatwise and with the rear face of the tooth pattern engaging the face 23, a suitable number of longitudinally spaced tooth patterns P, $P^1$, $P^2$ and $P^3$, to expose forwardly of the plane of the face 23 the front vertical half portions of the tooth patterns; upon setting of the cementitious material of the block 22, the assemblage appears as shown in the top and front elevations in Figures 1 and 2. The face 23 and the projecting portions of the tooth patterns are suitably smoothed, or cleaned, and are then painted over with a suitable composition which upon drying is electrically-conductive, and here any suitable known graphite-containing liquid may be used and painted on with suitable uniformity.

Such graphite paints comprise finely divided or powdered graphite with a suitable liquid binder which, upon drying or setting, holds the graphite particles together and onto the exposed portions of the face 23 of the block 22 and of the pattern teeth which, incidentally, may be natural teeth, if desired. As appears from Figure 2, the pattern teeth comprise principally those portions which in the mouth are exposed and are devoid of the root structure, and if desired, the upper ends of them may be conformed in any suitable way to provide stub-like portions for ultimate mounting or anchorage, as in the so-called mouth plates.

Onto the resultant conductive surfaces, I now electroplate a suitable metal, such as copper, and thus I may place the block in a suitable electrolytic bath 24 in any suitable vessel 25 having also suspended therein a bar or the like 26 of the metal to be plated, such as copper, and by any suitable means I then connect the conductive face or faces of the block 22 and the bar 26 to a suitable source of direct current energy indicated at 26.

Figure 3:
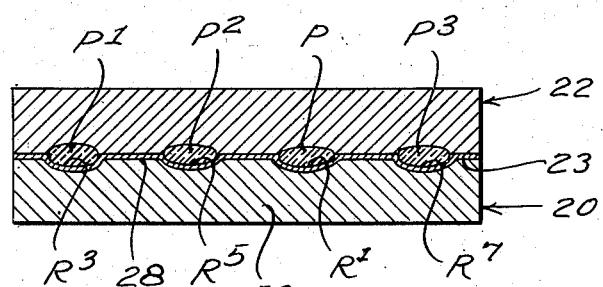
Figure 3 is a horizontal sectional view showing the pattern device as seen along the line A—A of Figure 2 after certain subsequent steps have been performed thereon to carry further the completion of the said one mold part.

Electro-deposition of the metal then proceeds and there is built up onto the conductive or graphitized exposed portions of the surface of the face 23 and of the tooth patterns projecting therefrom a layer of metal indicated in Figure 3 at 28, the contour of the upper face of which, as seen in Figure 3, follows in exact conformity the exposed contours and surface configurations of the tooth patterns and also of the face 23 of the block 22, in effect and thereby forming faithfully and precisely contoured and shaped mold recesses $R^1$ above briefly described. The electro-deposition of the metal of the layer 28 may be carried on to any desired extent, for example, to a sufficient extent to form the entire ultimately desired thickness of one of the mold parts, but preferably is carried on to give a thickness on the order, say, of $\frac{1}{32}$ of an inch to have sufficient strength and rigidity to resist deformation during handling and this layer 28 is then backed up by any suitable, preferably low melting point metal, such as white metal, as indicated at 29, in Figure 3, the latter procedure being the one selected for illustration in the drawings. Preferably the exposed face of layer 28, particularly the inside faces of the mold recesses, plated onto the copper a thin layer of nickel, rhodium, chromium or other suitable metal to avoid discoloring effects upon the moldable material employed; the exposed faces of the other mold parts later described are also similarly treated.

Figure 3 thus shows the block 22 with the tooth patterns and with the electroplated part 28 (resulting from the operation illustrated in Figure 1) and, where this second method is employed, with the ensuing step of backing up the plated layer 28 by the metal 29, the parts 28—29 thus in effect forming one of the above-mentioned mold parts, namely, mold part 20. The elements of this structure are now separated, cleavage taking place readily along the film-like coating of graphite above described, thus exposing the mold-recess face formed by electro-deposition, whence that face is now cleaned or buffed to remove the graphite film.

A companion mold part, namely, mold part 21, may be similarly constructed, but I prefer to remove the tooth patterns P, $P^1$, $P^2$, $P^3$, etc., from the block 22, then fit them neatly into the respective mold recesses R, $R^3$, $R^5$, $R^7$, etc., in the face of the electro-deposited portion of the mold part 20, after which I apply over all of the latter and over the exposed surfaces of the tooth patterns any suitable non-conducting coating material and preferably one that is not affected detrimentally by the electrolyte later to be employed, and here a thin coating of waterproof varnish, lacquer, or other suitable composition may be employed. Upon setting or drying, the coating aids in holding the tooth patterns in their respective mold recesses and thus the mold part is made electrically non-conductive on its entire surface. Then I apply to that coated face of the mold part 20 of Figure 3 that has the tooth patterns projecting from its plane (this time it will be noted only the vertical rear halves of the patterns project) a coating of conductive material such as the above-described graphite paint and when that is set, I treat the resultant structure just the same as I treat the block 22 as described in connection with Figure 1; thus I now electroplate a suitably heavy layer, shown at 30 in Figure 4, of metal onto this one face that was thus made conductive and thus form mold recesses R², R⁴, R⁶, R⁸, etc., which faithfully follow the surface configurations of the tooth patterns and this layer of electro-deposited metal 30, being virtually built onto the already prepared mold part 20, cannot escape being an accurate and precise and neatly fitting counterpart, as to each mold recess, to the mold recesses already formed in the mold part 20.

Here again, the entire mold part 21 may be built up by electro-deposition to the desired extent or, as in the preferred case, to a lesser extent and then filled in or backed up by other metal such as low melting point alloy, indicated at 31. Thus far it will be seen that the mold patterns P, P¹, P², P³, etc., are completely enveloped in accurately conformed metal (see Figure 4), there being, however, a plane of cleavage along the film of conductive coating, underlying which is preferably the non-conductive coating above described in order to lessen the risk of inseparably electro-depositing the metal onto the metal 28 of the mold part 20.

Figure 4:
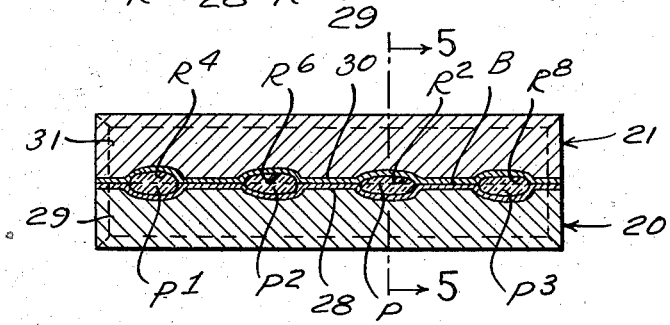
Figure 4 is a horizontal central sectional view showing the substantially completed one mold part of Figure 3 but after certain subsequent preferred steps have been performed thereon to substantially complete a companion mold part.
Figure 5:
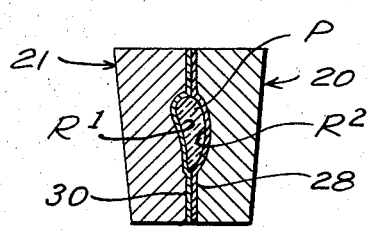
Figure 5 is a transverse vertical sectional view as seen along the line 5—5 of Figure 4.

The mated mold parts 20 and 21 are shaped in any suitable way as by machining or as in casting the filler metal 29 and 31 to give the assembled mold parts 20 and 21 a trapezoidal or wedge-like shape in preferably both transverse and longitudinal cross-sections as is indicated by the broken lines in Figure 4 and as appears from the sectional view of Figure 5, in order to facilitate, in a preferred manner later described, holding these two parts together. In Figure 5 is also clearly shown the complete envelopment of the tooth pattern P by the walls of the mold recesses R¹ and R² formed by the electro-deposited metal.

The two mold parts may now be separated, cleavage or separation taking place along the film of the graphite coating or the non-conductive coating, and now the tooth patterns may be removed, and the two mold faces that have the mating tooth mold recesses in them, may now be cleaned in any suitable manner to remove any vestiges of the coating or coatings, leaving the mold recesses of accurately contoured and conformed surface configurations.

In the two engaging faces of the mold parts 20 and 21 I provide any suitable means, such as alternated tapered pins or projections and recesses to insure mating accurately of the two mold parts when put together; these parts are not shown in the drawing and may be provided in any suitable way.

Figure 7:
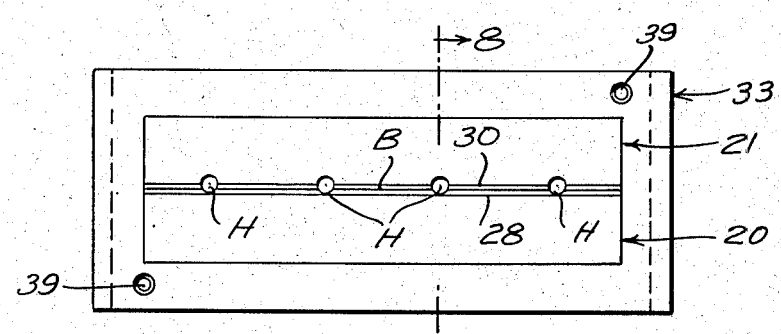
Figure 7 is a plan view of the said companion mold parts, again shown assembled and held in the assembly frame, but showing the results of certain subsequent steps.
Figure 8:
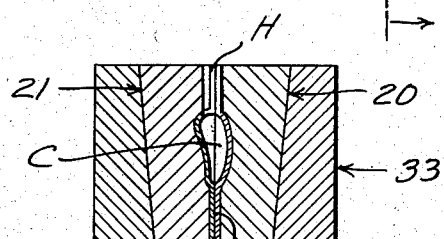
Figure 8 is a transverse vertical sectional view as seen along the line 8—8 of Figure 7.

The two mold parts are now put together, face to face, and set into a rectangular frame 33 (Figures 6, 7 and 8) provided with internal sloping faces to match the slopes of the wedge-like conformation of the assembled mold parts 20—21, thus in effect, when the two mold parts are pressed downwardly as viewed in Figure 8, insuring that the two mold parts are tightly pressed together.

Figure 6:
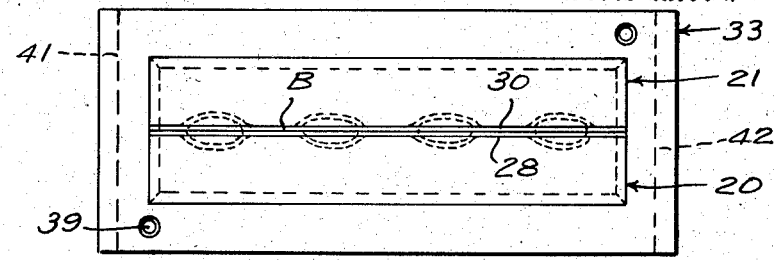
Figure 6 is a plan view of the companion mold parts of Figure 4, together with an assembly frame therefor.

So assembled, the assemblage appears in plan view as shown in Figure 6 and then I drill holes H as better shown in Figure 7 from the top face of the assembled mold parts 20—21 downwardly into the upper ends, respectively, of the thus far completely enclosed mold cavities, and in Figure 8 is shown in cross-section how the drilled hole H thus forms a passageway from the top face of the assembled mold structure to the upper end of the mold cavity C, that end corresponding to the upper or root end of the tooth pattern that was employed. As viewed in Figure 8, that portion of the cavity C to the right of the plane of cleavage B corresponds to the outer tooth portion and that to the left corresponds to the inner or rear half of the tooth, and preferably the holes H are drilled more to the rear side of the plane of cleavage B, as better shown in Figure 7, than to the other or front side, particularly if, in initially setting the tooth patterns in the block 22 of Figure 2 there is necessitated, as is frequently the case according to the shape of the tooth, a tilting inwardly or rearwardly of the upper or root end of the tooth patterns.

Figure 9:
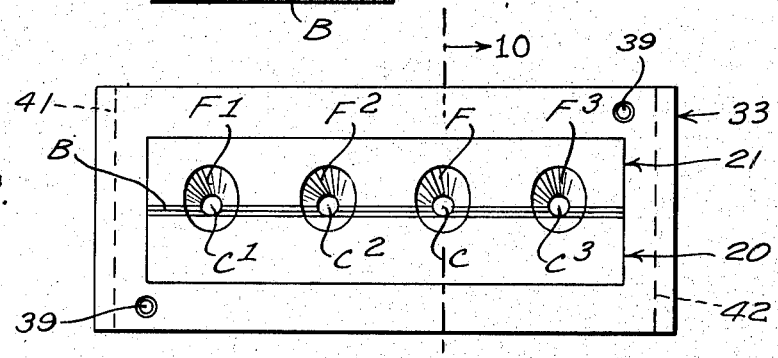
Figure 9 is a plan view of the two assembled mold parts and their frame showing the mold parts after performing certain subsequent steps.
Figure 10:
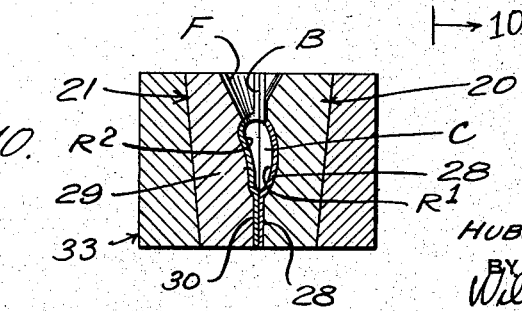
Figure 10 is a transverse vertical sectional view along the line 10—10 of Figure 9.

The volume represented by the holes H I preferably vary according to the size of the mold cavity and hence according to the volume of moldable material ultimately to be injected and according to the shrinkage characteristics of the moldable material employed. This I may do by utilizing different sizes of drills for drilling holes H but preferably, and more expeditiously, I may simply drill suitable holes H as above indicated and then, turning now to Figures 9 and 10, I may cut out metal from the walls of the holes H, preferably to taper them, giving them a funnel-like shape as at F, F¹, F² and F³ in Figure 9 and as is better shown at F in Figure 10. Any suitable tools may be employed, preferably hand tools for cutting the metal away and for thus determining the respective volumes of the passageways leading to the respective mold cavities. Where copper is employed, that is relatively soft as is well known, and where a low melting point alloy is employed as a filler metal, that too is easily carved or cut by appropriately shaped and sharpened tools. In Figure 9, I have indicated different sizes of these passageways F, F¹, F², F³ to illustrate variability according to the factors above mentioned and Figure 10 shows how both the filler metal and parts of the upper end portions of the electro-plated mold cavities are thus cut away.

Next the mold parts 20—21 are separated and the teeth patterns restored to position within the mold cavities, the patterns becoming completely enveloped, as indicated in Figure 11, with respect to the tooth pattern P, excepting the upper end or end face of the latter which remains exposed upwardly in the passageway F. The upper faces of the mold parts 20—21, the upper faces of all of the thus inserted tooth patterns, and the faces of the holes F are now painted with a non-conductive coating, such as above described, and when that is set a conductive coating is applied thereover, whence the assemblage is again treated like the part 22 of Figure 1 in that I now electro-deposit metal indicated in Figure 11 at 34 onto the just-described and now conductive faces, resulting in a third mold part which has a flat face 35 that mates accurately with the aligned flat top faces of the mold parts 20—21 and has projecting downwardly therefrom a number of what I shall term pressure elements E, E¹, E², E³, etc., one for each passage F, F¹, F², F³, etc., and each accurately tapered or otherwise conformed to the configuration of the mold passage into which it was virtually electro-deposited or built up, and moreover, dimensioned and shaped at its lower transverse portion, the portion exposed to the mold cavity, exactly as was the upper end of the tooth pattern itself.

That upper end may be given any conformation desired according to the manner in which the artificial tooth is ultimately to be mounted and where the ultimate fabricated tooth is to be made of a thermally-responsive plastic and is to be set into a plate of similar plastic, it need be only a stub-like extension as earlier mentioned, since, in assembling such a tooth and such a plate, there is some interflow or fusion or adhesion between the two plastics employed.

The part 34 of Figure 11 may be electro-deposited to any desired thickness, preferably as above indicated with respect to the other mold parts, and then I cast a suitable backing metal, such as white metal, onto it, as indicated at 36 in Figure 11, making the latter of sufficient expanse, both as to length and width, to cover over and mate with the assemblage of mold parts 20 and 21 and frame 33, as indicated in Figure 11, thus forming a companion mold part 37 which I arrange in any suitable way to be guided accurately into mating relation with the just-mentioned assemblage, as by a suitable number of taper pins 38 and taper holes 39, respectively distributed in any suitable way between the frame 33 and the mold part 37.

Such of the faces as had been coated as above described are now cleaned off, and the apparatus is ready to be used, and in Figure 12 I have shown the assembled mold parts 20 and 21, in the frame 33 and separated and withdrawn upwardly therefrom is the companion mold or pressure part 37; these parts are shown in cross-section with respect to the mold cavity C of Figure 9, and the mold cavity C is thus ready to be charged.

Into the latter, I now inject the moldable material in a manner depending upon the gradation of coloring desired in the ultimate tooth structure and in a quantity depending upon the size of the tooth and the shrinkage or other characteristics of the moldable material that is to be employed.

Preferably, I employ methyl-methacrylate; such materials, the same as are analogous to materials known as Plexiglas or Lucite, are available in powdered and potentially reactive form and out of such powder I make up a suitable number of separate or individual mixes each comprising some of this powdered potentially reactive resin-like material and a pigment or other coloring matter, each mix or batch differing in the color or shade of color of the pigment or coloring matter. Pigments employed are preferably in very finely divided powder-like form and each mix or batch is thoroughly mixed; dyes may also be employed according to the effects desired, but pigments in powdered form are preferred where opal-like or translucent, as distinguished from transparent, effects are needed, and by using finely divided pigments avoidance of speckled effects is more easily achieved.

Into the mold cavity C of Figure 12 I now inject by any suitable means successive quantities or layers, superimposed vertically one upon the other and hence substantially along the vertical axis of the mold cavity C, of moldable material taken from these variously pigmented batches or mixes, varying the choice of batch according to the color gradations or changes that are desired from the tip end of the ultimate tooth toward the root end and governing the thickness or vertical height of any injected layer according to the vertical extent in the ultimate tooth of that particular pigmentation.

Thus the initial charge in the bottom of mold cavity C of Figure 12 may be a small charge of substantially clear or unpigmented material or pigmented to a proper shade of white; the next several layers might be of successively deeper cream shade of pigmentation; the next one or two may be from batches of successively darker shades verging toward light brownish and the next succession of layers may progressively be of lighter pigmentation, or vice versa, according to the ultimate result desired. This building up is continued beyond the upper end of the mold cavity C, preferably to the accompaniment of suitable means to effect tamping or settling of the moldable material in the cavity C, as by tapping or vibrating the mold assemblage, and the rest of the passage F is completely filled (where its volume is proportioned to the volume of the mold cavity itself).

With all of the mold cavities thus charged, and it will be noted that in repeating the process to make the next batch of teeth from the same mold, different sequences of pigmented moldable materials may be employed as is necessary, the lower mold assemblage is now heated to a temperature, depending upon the materials employed, illustratively, in the case of methyl-methacrylate, a temperature on the order of 400° F., whence the charge within the mold jells, its top level dropping somewhat and then the top mold part 34 is brought down by any suitable means, as by relating the assemblage to a press, the pressure element E for each mold cavity portion or passageway F, F¹, F², F³, etc., entering the latter to compress or apply pressure to the mold charge, thus compacting it more and more in the cavity C, with the pressure increasing as each pressure element E narrows up the peripheral orifice about and between it and the walls of its passageway F, F¹, etc., such narrowing up of the orifice increasing the resistance to overflow or escape of surplusage, until the upper mold part 23 is brought completely down and the pressure elements E snugly interfitted into their respective passageways. A small quantity of the charge escapes during the process but a final and sufficiently high pressure is effected upon the material in each mold cavity to insure that the now plastic material is pressed into and against each and every configuration or conformation which the electroplated mold cavity walls have faithfully reproduced from the tooth patterns, whence, with the upper and lower mold sections clamped or otherwise suitably held in the position of final closure or of maximum pressure, curing of the plastic to a relatively hard, tough and strong resin-like material proceeds. The time and temperature of heat curing is suited to the materials employed. In the case of methyl-methacrylate, when used in dry-powdered form, heating to about 400° F. to the accompaniment of pressure will set it.

Upon completion of curing, the mold part 37 is withdrawn, the mold parts 20-21 are forced out of the frame 33 and are then laterally separated and the molded teeth removed from the mold recesses. Demarcations between what in the charging of the mold were layers of different shades of pigmentation are not discernible in the final product since during curing there is a nice merging of the material and pigmentation of one layer into those of the next one and the nicety of control of wide variations in pigmentations and the precision of reproduction of tooth contours and shapes aid in achieving naturalness of appearance of the ultimate tooth, so much so that it is easily distinguishable from artificial teeth heretofore available.

In Figure 12, which shows an illustrative mold cavity C charged as above described with the moldable material, I have indicated the charge at M by stippling and it will be understood that, where the moldable material employed is compressible (for example, under the action of the pressure element E) or is shrinkable during setting or heat-curing (methyl-methacrylate being somewhat shrinkable under these circumstances), the successive layers of differently shaded or pigmented materials with which the mold cavity C is charged in successive horizontal and vertically superimposed layers, are given greater vertical dimensions than those of the ultimate actual regions of the final or cured tooth to an extent to compensate for these factors; thus, for example, the portion of the material in the lower part of the passageway F (being the portion just above the upper end of the actual tooth contour of the mold cavity C) may contain most or all of the uppermost pigmented layer intended for the upper portion of the ultimate tooth itself; the factors of downward compacting or pressing or shrinking within the mold, during curing, bringing that layer downwardly into the desired relation to the upper portion of the tooth cavity C itself. Where the material employed is such as to make desirable the complete filling up of the passageway F, the rest of the passageway F above the above-mentioned lower portion thereof may be filled with the same pigmented material.

In Figure 12, I have indicated by broken horizontal lines a succession of differently pigmented or shaded layers $L^1$, $L^2$, $L^3$, etc., by way of illustration of the nicety of control of color gradations by superimposing one upon the other and in succession moldable materials correspondingly selected from differently pigmented batches or mixes and to illustrate how, for example, six or seven successive layers may be used to make up a charge and thus in the ultimate tooth create the desired color changes or gradations. With such a showing in Figure 12 I have assumed, for purposes of illustration, that the material employed, in its potentially reactive state, for example, when it is first heated up and becomes plastic as in the case of methyl-methacrylate in powdered form, has some degree of pressibility, thus to make up, by the forcing into the mold cavity C of some of the material in the passage F, for the factor of shrinkage during final curing. Such actions as these, it will now be seen, are compensated for insofar as the successive layers of pigmented moldable materials are concerned by building these layers upwardly beyond the tooth cavity C and into the passage F. Where a greater degree of pressure or of flow of material downwardly from the passage F into the upper end of the mold cavity C is needed, the degree of taper of the walls of passage F and of the faces of the pressure element E are made correspondingly less, this change in relationship being in a direction toward making the pressure element E and the passageway F substantially like a piston and cylinder as would be the case if the moldable material employed required only appropriate compacting and in such case, with minimum or no escape of surplus material, the quantity of charge in the mold and the extent to which the pressure element E enters the passage F would, of course, be appropriately interrelated. Thus the method and apparatus employed will be seen to have a substantial flexibility to accommodate them to handling a wide range of moldable materials. Likewise, the curing or setting of the moldable material may be varied as to procedure or treatment according to the characteristics of the moldable material employed, though it is preferred that that be accomplished within the mold cavity and that correspondingly appropriate moldable materials be employed; it will be understood, however, that, insofar as certain features of my invention are concerned, there are materials available, which, after forming in the mold apparatus, may be heat-treated or otherwise set outside of the mold.

Likewise, the batches of differently pigmented mixes need not be in powdered form as above described in the illustrative embodiment, but can be in the form of paste-like or analogous wet mixes. For example, if the material employed is a substance like methyl-methacrylate, its powdered form may be mixed with different pigments to make up different batches and then there is added to each batch a plasticizer, usually in liquid form, capable of reacting and crosslinking with the methyl-methacrylate during subsequent heat treatment. From such pastelike batches the successive layers above described, for example, in connection with Figure 12, may be built up. In such case, curing at suitable temperature, say 155° F., for sufficient time, such as three or four hours, will set the molded material.

The sectional mold apparatus lends itself to convenient facility in handling and manipulating. Thus, for example, and referring to Figure 12, I may provide the mold frame 33, at its opposite ends with slots 41 and 42 into which may be slid lugs 43 and 44 of a yoke 45 that is provided with, for example, a screw 46 threaded in a suitable threaded hole in a hub 45ª of the yoke, to press the mold part 37 downwardly (as viewed in Figure 12) toward the mold parts 20—21 held assembled in the frame 33, and to hold all of these parts assembled as in Figure 13, particularly where curing or heat treatment or the like is to take place in the molds. Thus I may make up the apparatus relatively small, if desired, and submerge the assemblage like that shown in Figure 14 in a liquid such as water, maintained at the desired curing temperature, there being available moldable heat-settable materials that can be cured in, for example, boiling water.

Any suitable means, such as the handle 47, may be employed to operate the screw 46 and preferably at its lower end it is provided with a platen 48 rotatably secured by any suitable means as at 49 to the lower end of the screw, thus to provide a suitably large engagement with the mold element 37 to evenly distribute the pressure applied, and preferably the part 48 is dimensioned to fall within the area of the bottom faces of the mold parts 20 and 21 as seen in Figures 12 and 13, so that, after disassembling mold part 37 from the frame 33 and the mold parts 20—21, the yoke 45 may be assembled to the frame 33 to present the platen 48 to the underfaces of the mold parts 20—21, and thus, upon operating the screw, force the mold parts 20—21 out (upwardly as viewed in Figure 12), of the wedging grip that the mold frame 33 has thereon.

Ultimate separation of the mold parts 20 and 21, after removal of the latter from the frame 33, releases the molded tooth members which, if cured within the mold, require virtually no further steps of processing, it being noted that, from the manner of making the mold recesses in mating pairs such as the recesses $R^1$ and $R^2$ (Figures 5, 8 and 10), the molded tooth elements are easily removed even if some of them have a tendency to stay assembled to one mold recess rather than to the other. The molded tooth elements, moreover, can have such shank portions at the upper or root ends thereof as may be desired according to the method of mounting, one illustrative form thereof having been mentioned above. The shape and dimension and surface conformations or irregularities or the like as are present in the pattern teeth are all faithfully reproduced and the manner of making up the mold recesses in the two adjacent faces of the two mold parts, particularly where one mold part like the part 20 of Figure 3 comprising the elements 28—29 with the mold recesses R¹, R³, R⁵, etc., and the respective tooth patterns P, P¹, P², etc., to make up the counterpart mold 21 with its mating recesses R², R⁴, R⁶, etc., insures perfect registry of the walls of the mating mold recesses and hence, with the two mold parts 20—21 held together as in Figure 12 and undisturbed during the charging and molding since it will be seen that I can avoid having to separate them for charging purposes, the final molded teeth forms are devoid of fins or lines coincident with the cleavage plane B (Figure 12) along which the two mold parts are abutted.

Moreover, it will be seen that the apparatus lend themselves to being operated rapidly and efficiently. For example, though the mold is charged from above as in Figure 12, and though certain of the tooth patterns and hence tooth cavities and hence also the molded teeth themselves may be wider at the bottom than at the top as viewed in Figure 2, removal of the molded teeth from the mold parts takes place without distortion of any of the parts and hence without marring or injuring either the molded tooth or the mold cavities or the precision of conformation of the surfaces of the latter, particularly where such precision is achieved by electro-depositing metal to form the mold recesses though it will be understood that, insofar as certain features of my invention are concerned, the two mold parts with their adjacent faces that contain the mold recesses may be made or constructed by depositing the material other than by electro-deposition.

Moreover, I am enabled to achieve non-uniformity or contrasts of color gradations amongst the different teeth of a set of teeth to be made, all in a simple and expeditious manner. Thus, referring to Figure 12, I may charge any number of mold cavities with the same succession of differently pigmented moldable materials but using for each corresponding increment or layer amongst the different mold cavities the same quantity of pigmented material so that, because of the varying cross-sections of the mold cavities, due to the differing shapes and sizes of the initial tooth patterns, there will be present in the ultimate teeth analogous gradations as to color but in such differently dimensioned transverse regions as will give contrasts in shadings and coloring, particularly amongst the different kinds of teeth, such as centrals, laterals and cuspids.

Thus it will be seen that there has been provided in this invention apparatus for making them in which the various objects hereinbefore noted together with many thoroughly practical advantages are successfully achieved.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

An apparatus for molding artificial teeth comprising two mold parts made of a rigid material and having adjacent contacting faces in which are mold recesses corresponding respectively to the two vertical halves of a tooth pattern, said mold parts having a charging channel leading to the root end of the mold cavity formed by the mating recesses, said two mold parts having companion external portions together forming a taper, a frame for receiving said two mold parts and having portions coacting with said taper to press said two mold parts together when they are forced into said frame, a companion mold part having a pressure element enterable into said charging channel, a mechanism having a supporting structure with a movable pressure-applying element for receiving said frame in either of two positions of the latter relative to the supporting structure, in one of which positions said frame and mold parts are positioned so that said pressure-applying element operates upon said companion mold part to enter said pressure element into said charging channel and in the other of which positions said pressure-applying element operates to effect movement between said frame and said two molding parts to force the latter out of the former, said supporting structure comprising substantially a yoke, the arms of which and said frame have interengageable supports for selectively positioning said frame for coaction of said pressure-applying element either with said companion mold part to enter said pressure element into said charging channel or with said two mold parts to force the latter out of said frame.

HUBERT KOHRMAN.

REFERENCES CITED

The following references are of record in the file of this patent:

UNITED STATES PATENTS

| Number | Name | Date |
| --- | --- | --- |
| 1,000,187 | Moore | Aug. 8, 1911 |
| 1,370,191 | Crate | Mar. 1, 1921 |
| 1,545,455 | Radford et al. | July 7, 1925 |
| 1,609,460 | Buttles | Dec. 7, 1926 |
| 1,834,763 | Bonsieur | Dec. 1, 1931 |
| 1,868,788 | Zinser | July 26, 1932 |
| 2,063,315 | Kuettel | Dec. 8, 1936 |
| 2,156,459 | Mucher | May 2, 1939 |
| 2,192,902 | Erdle | Mar. 12, 1940 |
| 2,196,258 | Erdle | Apr. 9, 1940 |
| 2,345,305 | Thornton | Mar. 28, 1944 |

FOREIGN PATENTS

| Number | Country | Date |
| --- | --- | --- |
| 837,831 | France | Nov. 18, 1938 |

OTHER REFERENCES

"British Plastics": Injection molding of thermosetting materials, pp. 579–634; March and April 1939, p. 629—Fig. 3.